April 12, 1938.                R. H. DRAEGER                2,113,580
                            ADJUSTABLE FILM GATE
                            Filed April 6, 1937              2 Sheets-Sheet 1
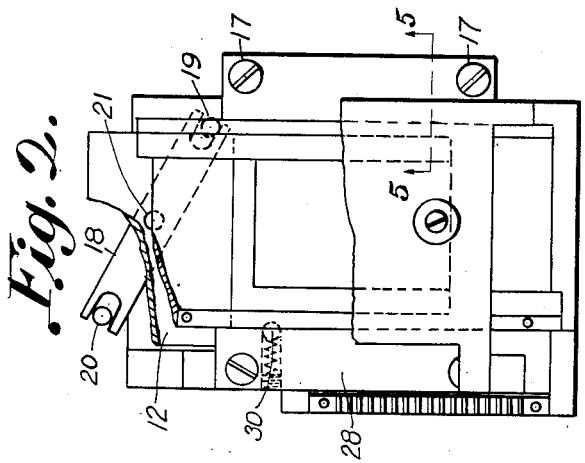
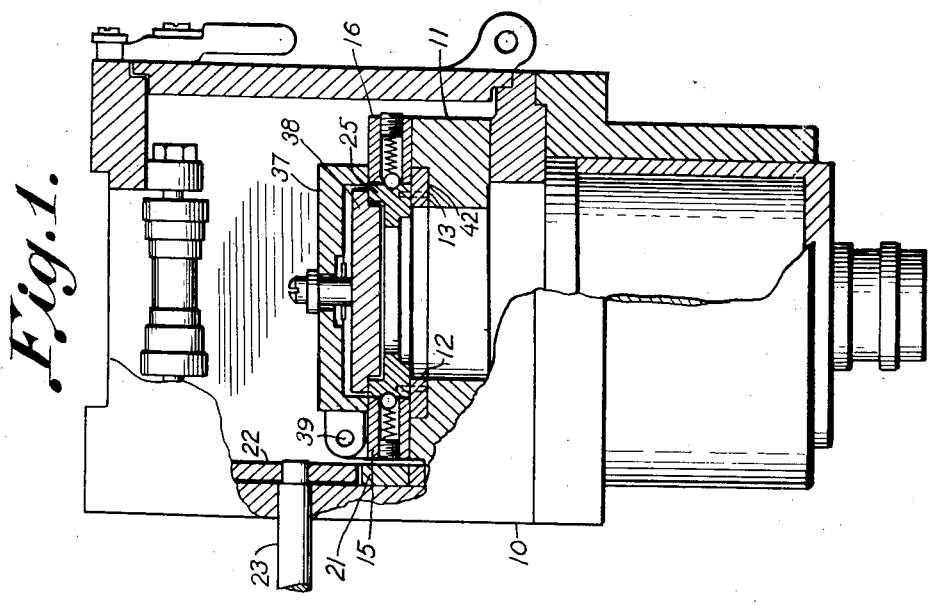
INVENTOR.
RUPERT H. DRAEGER
BY
ATTORNEYS.

April 12, 1938.  R. H. DRAEGER  2,113,580
ADJUSTABLE FILM GATE
Filed April 6, 1937   2 Sheets-Sheet 2
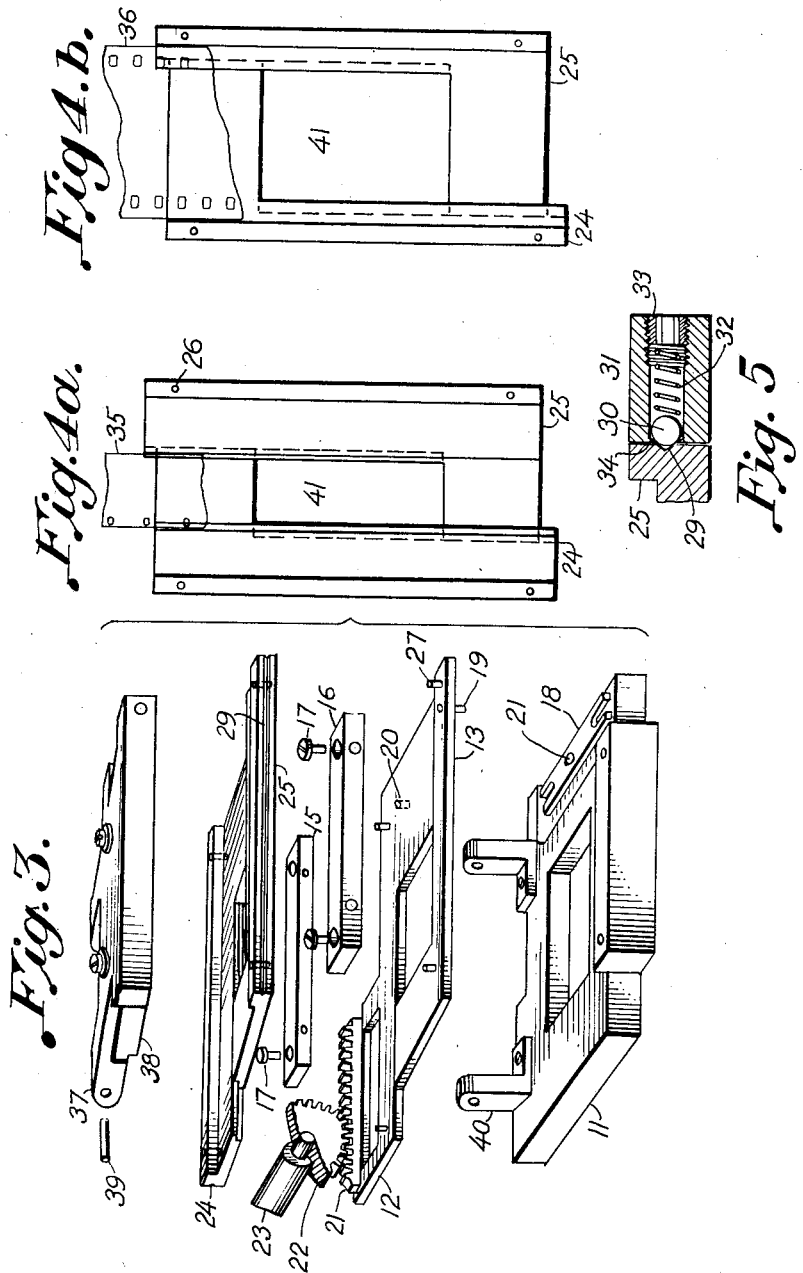
INVENTOR.
RUPERT H. DRAEGER.
BY
ATTORNEYS.

Patented Apr. 12, 1938

2,113,580

UNITED STATES PATENT OFFICE 2,113,580

ADJUSTABLE FILM GATE

Rupert H. Draeger, United States Navy

Application April 6, 1937, Serial No. 135,266

4 Claims. (Cl. 95—65)

(Granted under the act of March 3, 1883, as amended April 30, 1928; 370 O. G. 757)

This invention relates to adjustable film gates for use in copying cameras, projectors, enlargers or the like and more particularly to the type of film gate illustrated and described in my Patent No. 2,073,627 of March 16, 1937.

In cameras of this type or the like it is both desirable and economical that only that length of film be exposed which is equal to the length of the image of the object being copied. When larger or smaller objects are copied it is also desirable to be able to use more than one width of film in order to effect further economies.

The object of this invention is to provide an adjustable film gate having readily replaceable film gate pieces to serve for the use of more than one width of film.

Other objects of this invention will be apparent from these specifications and the accompanying drawings forming a part thereof and the scope is to be limited only by the claims appended hereto.

In the drawings:

Fig. 1 is a side elevation of a camera partially broken away to show the film gate.

Fig. 2 is a plan view of the film gate partially broken away to show the gate pieces.

Fig. 3 is an exploded view of the film gate mechanism showing the relation between the various parts.

Figs. 4a and 4b are plan views of two sizes of interchangeable film gate pieces, and Fig. 5 is a sectional view on lines 5—5 of Fig. 2.

In the accompanying drawings Fig. 1 shows one form of camera constructed in accordance with the present invention. In the camera case 10 is shown a base 11 having a recess 42 in which the two gate carrier members 12 and 13 are slideably supported. These members are retained by two guides 15 and 16 which are attached to the base 11 by screws 17.

The pins 19 and 20 attached to gate carrier members 12 and 13 extend into the slotted ends of toggle 18, which is rotatably mounted on pin 21 attached to frame 11.

The gate carrier member 12 is provided with rack 21 which engages spur gear 22 mounted on control shaft 23.

The gate pieces 24 and 25, having apertures 41 of a size appropriate to the width film to be used, different sized apertures being provided for different widths of film as shown at 35 and 36, are mutually interlocking as disclosed in my above mentioned Patent 2,073,627. These gate pieces are fitted with locating holes 26 which fit over pins 27 and are slidably held in place by guides 15 and 16.

The gate pieces 24 and 25 are further fitted with grooves 29 to receive the balls 30 protruding from holes 31 in the guides. These balls 30 are thrust into grooves 29 by springs 32 retained by plugs 33 and are prevented from escaping from holes 31 by lips 34. The film gate pieces 24 and 25 are recessed to receive the different width films 35 and 36.

The film gate cover 37 and pressure plate 38 are rotatably attached to the arms 40 of base 11 by pins 39.

In operation, when it is desired to change the length of the film exposed in the film gate, the length of the aperture 41 may be increased or decreased by the proper manipulation of the control rod 23. When it is desired to use another width of film the cover 38 may be raised and the film gate pieces 24 and 25 replaced by film gate pieces of a different aperture width to accommodate the different width of film.

The invention described herein may be manufactured and used by or for the Government of the United States of America for governmental purposes without the payment of any royalties thereon or therefor.

What I claim is:

1. A film gate having means for permitting the exposure of different lengths of more than one width of film, said film gate consisting of two removable film gate pieces providing the complete film gate aperture and means for guiding film through said film gate parallel to the center line of the length of the aperture in said gate.

2. A film gate comprising in combination a plurality of removable film gate pieces providing the complete film gate aperture, and means for actuating said film gate pieces, said means being removably associated with said film gate pieces to permit the interchanging of said film gate pieces with other film gate pieces having different width apertures for accommodating more than one width of film.

3. A film gate comprising means for exposing different lengths of film, said means including removable film gate pieces, carrier means adapted for holding film gate pieces for accommodating different widths of film, said film gate pieces being in the same plane in cooperative light-tight slideable engagement with each other, means for removably attaching said film gate pieces to said carrier means, toggle means for causing the movement of one gate piece to partake of the linear movement of the other in an opposite direction and means for adjusting said carrier means by a rack and pinion connected therewith.

4. A film gate having means comprising interchangeable substantially L-shaped pieces for permitting the exposure of different lengths of film; and means for detachably mounting said pieces and for permitting relative motion thereof, whereby varying lengths of a plurality of widths of film may be masked by said gate.

RUPERT H. DRAEGER.